United States Patent Office 3,336,346
Patented Aug. 15, 1967

3,336,346
9β,10α-ANDROSTA-2,4,6-TRIENE 3,17β-DIOLS AND THE 6-HALO DERIVATIVES THEREOF
Pieter Westerhof and Hendrik Frederik Louis Schöler, van Houtenlaan, Weesp, Netherlands, assignors to North American Philips Company, Inc., New York, N.Y., a corporation of Delaware
No Drawing. Filed Jan. 18, 1965, Ser. No. 426,403
Claims priority, application Netherlands, Jan. 20, 1964, 64—370
11 Claims. (Cl. 260—397.5)

The invention relates to new 9β,10α-steroids of the general formula

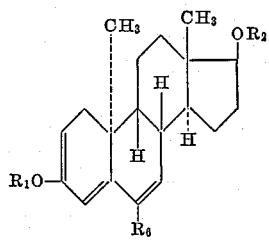

in which formula $R_1O$ represents an etherified or an esterified hydroxy group, $R_6$ represents a hydrogen atom or a fluoro, chloro or bromo atom, $OR_2$ represents a hydroxy, an etherified or an esterified hydroxy group.

The compounds according to the invention have anabolic activity and show a strong influence on the pituitary. In addition to the anabolic activity, the 6-chloro compounds show a strong pituitary stimulating activity and increase the effect of exogenous and endogenous testosterone on the peripheral target organs. This pituitary stimulating effect is also true for females where in the presence of the ovaries estrogenic activity was found, while this estrogenic activity could not be measured in spayed females.

Further it should be observed that in the case $R_6$ is hydrogen, the compounds are anabolic and pituitary inhibiting.

The compounds according to the invention may find application in the correction of fertility complaints, in particular with males. The 6-chloro compounds according to the invention have a stimulating influence on activities related to fertility with males.

The hydrogen atoms or methyl groups at the carbon atoms 8, 9, 10, 13 and 14 of the compounds according to the invention have the same stereochemical configuration as the corresponding hydrogen atoms and methyl groups in dihydro-isolumisterone. Castells et al. Proc. of the Chemical Society, Jan. 1958, page 7 has shown that dihydro-isolumisterone has the configuration 8β,9β,10α-methyl, 13β-methyl,14α.

The novel steroids of the invention are indicated as 9β,10α-steroids to indicate at which carbon atoms (9 and 10) the stereo-configuration deviates from the one of the normal steroids and in which sense (9β,10α in contradistinction to the 9α,10β-configuration of the normal steroids).

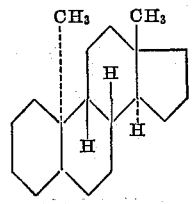

In the above given structural formulae the β-position at the carbon atoms 8, 9 and 13 is indicated by a solid line, whereas the α-position at the carbon atoms 10 and 14 is indicated by a broken line. It should be observed that the configuration of the hydrogen atoms or substituents at the other carbon atoms may be either α, β or planar. Whether a hydrogen atom or a substituent at these other carbon atoms is in one of these positions is indicated by the chemical name only and not by the chemical formulae, unless explicitly so expressed as in the case of a dotted line which always indicates the α-position.

An etherified hydroxy group is for example an alkoxy group of 1–20 carbon atoms, e.g., methoxy, ethoxy, t-butoxy group or an aralkoxy group being the aralkoxy group of a mixed aromatic aliphatic alcohol in which the oxy group is attached to the aliphatic part which latter group contains from 1–6 carbon atoms, e.g., benzyloxy or 2-phenylethoxy.

An esterified hydroxy group is for example a hydroxy group esterified with an aliphatic- or alicyclic mono- or di-carboxylic acid containing from 1–20 carbon atoms, e.g., formic acid, acetic acid, propionic acid, capronic acid, enanthoic acid, decanoic acid or undecylenic acid, palmitic acid, cyclohexane mono-carboxylic acid, succinic acid, or a phenylalkyl mono- or dicarboxylic acid, e.g., benzoic acid, phenyl acetic acid, cinnamic acid or phenylpropionic acid.

Compounds of the underlying invention are for example: 9β,10α-androsta-2,4,6-triene - 3,17β-diol-3,17-diacetate (pituitary inhibiting and anabolic activity), 6-chloro - 9β,10α-androsta-2,4,6-triene - 3,17β-diol-3,17-diacetate (pituitary stimulating and anabolic activity) and 6-fluoro - 9β,10α-androsta-2,4,6-triene - 3,17β-diol-3,17-diacetate (anabolic activity).

Other compounds of the invention are, e.g., 9β,10α-androsta-2,4,6-triene-3,17β-diol 3,17-dicaproate and the corresponding 6-chloro compound; 3-ethoxy-6-chloro-9β,10α-androsta-2,4,6-trien-17β-ol 17-acetate and the corresponding 6-bromo- and 6-fluoro compounds; 9β,10α-androsta-2,4,6-triene-3,17β-diol 3-propionate and the corresponding 6-chloro compound; 17β-benzyloxy-9β,10α-androsta-2,4,6-trien-3-ol 3-acetate and the corresponding 17β-t.butoxy and 17β-cyclopentyloxyl compounds; 6-chloro - 17β-benzyloxy - 9β,10α-androsta - 2,4,6-trien-3-ol 3-acetate and the corresponding 17β-t.butoxy and 17β-cyclopentyloxy compounds; 6-fluoro-17β-benzyloxy-9β, 10α-androsta - 2,4,6-trien-3-ol 3-acetate and the corresponding 17β-t.butoxy and 17β-cyclopentyloxy compounds; 3-cyclopentyloxy-6-chloro-9β,10α-androsta-2,4,6-trien-17β-ol 17-acetate and the corresponding 6-bromo- and 6-fluoro compounds.

The compounds according to the invention may be prepared from 9β,10α-steroids by methods known per se.
In particular the methods of producing the new 9β,10α-steroids are characterized in that
(a) a compound of the formula

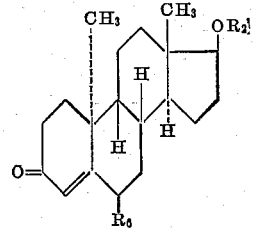

in which formula
$R_6$ represents a hydrogen atom or a fluoro, chloro or bromo atom, $OR_2$ represents a hydrogen, an etherified or an esterified hydroxy group, is subjected to an enolesterification reaction;

(b) a compound of the formula

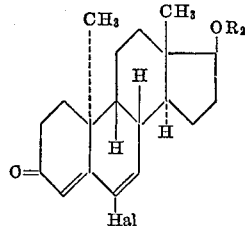

in which formula

Hal is a fluoro, chloro or bromo atom,
$OR_2$ represents a hydroxy, an etherified or an esterified hydroxy group, is subjected to an enoletherification reaction;

(c) a compound of the formula

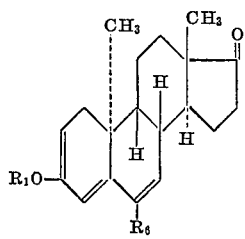

in which formula $R_1O$ represents an etherified or an esterified hydroxy group,
$R_6$ represents a hydrogen atom or a fluoro, chloro or bromo atom, is subjected to reduction of the 17-keto group with a reducing agent capable of reducing a keto oxygen atom to a secondary alcohol group, (d) a compound of the formula

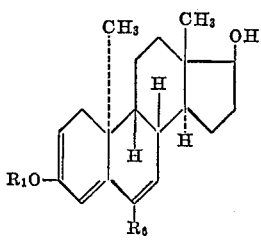

in which formula $R_1O$ represents an etherified or an esterified hydroxy group,
$R_6$ represents a hydrogen atom or a fluoro, chloro or bromo atom, is subjected to an esterification or an etherification reaction at the 17-hydroxy group.

It should be observed that 6-halo-3-keto-4,6-bisdehydro-9β,10α-steroids may be prepared by reacting a 3-keto-4,6-bisdehydro-9β,10α-steroid with a peracid, e.g., monoperphthalic acid, followed by reacting thus produced 3-keto-4-dehydro-6,7-oxido-9β,10α-steroid with a hydrogen halide, e.g., hydrogen bromide, -chloride or -fluoride in a non-aqueous medium followed by dehydrating thus produced 3-keto-4-dehydro - 6 - hydroxy - 7 - hydroxy-9β,10α-steroid, e.g., with hydrogen bromide or hydrogen chloride, e.g., in a polar solvent such as acetic acid.

The methods enumerated hereabove under (a)–(d) inclusively have been described in literature in more detail. A survey thereof follows herebelow (the letters (a) to (d) refer to the corresponding paragraphs (a)–(d) as indicated herebefore).

The expression "steroid" in this survey is used to say that the known methods have been described in literature in relation to either normal steroids or to 9β,10α-steroids and to indicate that these methods can be applied to 9β,10α-steroids to prepare the compounds of the underlying invention.

(a) *Introduction of the 3-enolester-$\Delta^{2,4,6}$-system* by enolesterification of a 3-keto-$\Delta^{4,6}$-9β,10α-steroid, e.g., by (1) reaction of a 3-keto-$\Delta^{4,6}$-9β,10α-steroid with an isopropenylester, such as isopropenylacetate, in the presence of a catalyst, e.g., p-toluene sulphonic acid. (British Patent 893,237.)

(2) reaction of a 3-keto-$\Delta^{4,6}$-9β,10α-steroid with a carboxylic anhydride and a carboxylic halide, e.g., acetic anhydride and acetyl chloride. (I. M. Heilbron et al., J. Chem. Soc. 1938, 869.)

(3) by enolesterification of a 3-keto-$\Delta^{4,6}$-6-halo-9β,10α-steroid, e.g., by reaction with a carboxylic anhydride and a carboxylic halide whether or not in the presence of a catalyst, e.g., by reaction with acetic anhydride and acetyl chloride in the presence of pyridine. (K. Brückner et al., Chem. Ber. 94, 1225 (1961).)

(b) *Introduction of the 3-enolether-$\Delta^{2,4,6}$-6-halo-system* by enoletherification of a 3-keto-$\Delta^{4,6}$-6-halo-9β,10α-steroid, e.g., by reaction of such a 9β,10α-steroid with an orthoformate ester in the presence of a catalyst, e.g., with ethylorthoformate and p-toluene sulphonic acid.

(c) *Introduction of a hydroxy or esterified or etherified hydroxy group at carbon atom 17* by reduction of a 17-keto-9β,10α-steroid with a reducing agent capable of reducing a keto oxygen atom into a secondary alcohol group. The reduction may be carried out with lithium aluminum hydride, sodium borohydride, lithium tritertiary butoxy aluminium hydride, sodium trimethoxy borohydride, lithium borohydride, diborane ($B_2H_6$) or may be carried out according to the reduction method of Meerwein-Ponndorf-Verley.

The reduction is preferably carried out under mild conditions in order to maintain the specific groups in the A and B rings of the steroid nucleus, e.g., mild temperature and equivalent amounts of reacting agents.

(d) *Esterification or etherification of the 17-hydroxy group*

Esterification of the 17-hydroxy group may be carried out by reacting a 17-hydroxy compound with an acid, acid anhydride or acid chloride, e.g., acetic acid, acetic anhydride or acetyl chloride in the presence of a catalyst for example p-toluene sulphonic acid, pyridine-HCl or acid binding agents (for example organic bases, e.g., diethylaniline) or waterbinding agents (e.g., trifluoro acetic acid anhydride).

Etherification of the 17-hydroxy group may be carried out by reacting the 17-hydroxy compound with a suitable hydroxy compound, e.g., methanol or ethanol, if desired in the presence of a catalyst, such as for example hydrochloric acid, pyridine-hydrochloric acid and p-toluene sulphonic acid, according to the method described by Ercoli et al. (J. Am. Chem. Soc. 82, 746 (1960)).

It should be observed that a preferred embodiment of the invention consists of compounds of the formula

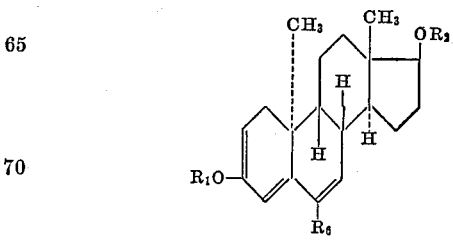

in which formula $R_1O$ represents an esterified hydroxy group, $R_6$ is a hydrogen atom or a fluoro or chloro atom and $OR_2$ is a hydroxy group or an esterified hydroxy group. It is of special advantage when the esterified hydroxy group at carbon atoms 3 and/or 17 contains from 10–20 carbon atoms in view of the prolonged activity of such compounds. Such favourable esterified hydroxy groups are for example hydroxy groups esterified with caproic acid or enanthoic acid.

The compounds according to the invention may be worked up to pharmaceutical or veterinarian preparations in the usual manner. Thus they may be worked up to injection liquids, suppositories, tablets, capsules and the like. In working up one should bear in mind that the compounds are poorly soluble in aqueous media. Thereagainst they are fairly soluble in oils and in fats or waxes. Due to these properties the compounds according to the invention are suitable to be worked up into oily injection liquids or suppositories. For example sterile solutions of 10 mgs. of active substance in 1 ml. of arachid oil can be used. The suppositories may be produced on the base of cacao butter, a mixture of gelatin and glycerol (glycerinated gelatin), polyethylene glycols or esters of higher aliphatic alcohols and higher aliphatic carboxylic acid, e.g., carbowaxes. A normal suppository has a weight of 2 or 3 grams and contains 10–50 mgs. of active substance.

*Preparation of starting material*

17β - hydroxy-9β,10α-androsta-4,6-dien-3-one obtained by dehydrogenation of 17β-hydroxy-9β,10α-androst-4-en-3-one (known from Belgian patent specification 577,615) with chloranil was acetylated in dry pyridine by addition of freshly distilled acetyl chloride dissolved in dry benzene at a temperature of 0° C. while stirring and cooling at 0° C. After stirring had been continued for five hours at room temperature the reaction mixture was worked up by pouring it out into a mixture of 1 part (by weight) of concentrated sulphuric acid and 4 parts of crushed ice. The mixture was extracted with diethyl ether, the ethereal solution was washed with an aqueous solution of sodium bicarbonate and with water; after drying on sodium sulphate and filtration the solvent was evaporated. The resulting product was recrystallised from a mixture of acetone-hexane affording crystals of 17β-hydroxy-9β,10α-androsta-4,6-dien-3-one 17-acetate.

The compounds thus produced was dissolved in a solution of perbenzoic acid in chloroform at 0° C. After standing at room temperature for 45 hours the mixture was worked up and chromatographed through a column of silica gel. The crude 6,7-epoxide was divided into two equal parts. One part was treated according to method (a), the other part to method (b) to be followed herebelow.

(a) The crude epoxide was dissolved in chloroform (ethanol-free) and to this solution was added a 6%-ic solution of dry hydrochloric acid gas in water-free acetic acid. After standing at room temperature for four hours, work-up was perforated by pouring out into ice-water and extraction with methylene dichloride.

The organic layer was washed with an aqueous solution of sodium bicarbonate and water.

Evaporation of the dried and filtrated methylene chloride solution afforded crude 6-chloro-17β-hydroxy-9β,10α-androsta-4,6-dien-3-one 17-acetate. The compound was recrystallised from ethanol at 0° C. Melting point 156.5–157.5° C. (dec.) (vacuo).

$\epsilon$(max.=286 nm.)=20800 (methanol).
$[\alpha]_D^{25}=-431.5$ (chloroform).
I.R.: 1740, 1670, 1620, 1590, 1420, 1250, 1048, 1032 and 890 cm.$^{-1}$.

(b) One part of the hereabove mentioned crude epoxide was dissolved in 30 parts of chloroform, to which solution was added a mixture of 4 parts of hydrogen fluoride, 4 parts of chloroform and 7 parts of tetrahydrofuran.

After standing at room temperature for three days the mixture was poured out into an aqueous solution of sodium bicarbonate. The 6,7-fluorohydrin thus produced was extracted with chloroform. After washing with water, drying over sodium sulphate and filtration, the chloroform was evaporated in vacuo. The crude product was dissolved in 20 parts of water-free acetic acid after which 2 parts of hydrogen bromide dissolved in 6 parts of acetic acid were added. After one hour at room temperature the reaction mixture was poured out into an aqueous sodium bicarbonate solution. After washing with water, drying over sodium sulphate and filtration the solvent was evaporated in vacuo. The residue was recrystallised from ethanol at −5°, thus producing 6-fluoro-17β-hydroxy-9β,10α-androsta-4,6-dien-3-one 17-acetate.

Melting point: 154–155.5°.
$\epsilon$(max.=285 nm.)=2300 (methanol).
$[\alpha]_D^{25}=-372°$ (chloroform).
I.R.: 1732, 1674, 1657, 1600, 1252, 1246, 1101, 1029 and 877 cm.$^{-1}$.

EXAMPLE I

A mixture of two drops of concentrated sulphuric acid, 2.5 ml. of freshly distilled isopropenylacetate and 2.5 g. of 17β-hydroxy-9β,10α-androsta-4,6-dien-3-one, as prepared according to P. Westerhof e.a. Recueil des Travaux Chimiques des Pays Bas 79, page 794 (1960), was heated at reflux-temperature in a nitrogen atmosphere under exclusion of moisture for 2 hours. After cooling to 0° C., the acid was neutralized by the addition of 0.25 ml. of pyridine and 100 mg. of sodium bicarbonate. After dilution with dry diethyl ether filtration was carried out. The filtrate was evaporated to dryness in vacuo at low temperature. The residue was crystallised from methanol containing 1% of pyridine at −25°. Suction gave 1.80 g. of 9β,10α-androsta-2,4,6-triene-3,17β-diol, 3,17-diacetate with a melting point of 155–157°. One recrystallisation afforded the pure substance with a melting point of 164–165°.

$[\alpha]_D^{25}=-45°$ (CHCl$_3$).
$\epsilon$(max.=301 nm.)=13300 (methanol).
Found: C, 74.59, 74.25; H, 8.09, 7.98; O, 17.92, 17.66.
Calcd. for C$_{23}$H$_{30}$O$_4$ (370.47): C, 74.56; H, 8.16; O, 17.28.
Infrared bands at: 786, 870, 885, 921, 1023, 1048, 1121, 1218, 1259, 1373, 1562, 1662, 1742 and 1760 cm.$^{-1}$.

EXAMPLE II

A solution of 1.9 g. of 6-fluoro-17β-hydroxy-9β,10α-androsta-4,6-dien-3-one 17-acetate in 25 ml. of distilled acetic anhydride, 5 ml. of distilled acetyl chloride and 1.1 ml. of dry pyridine was heated at steam-bath temperature in a nitrogen atmosphere for three hours. The solvents were distilled off in vacuo and the crystalline residue was recrystallized from methanol containing a trace of pyridine at 0° C. Suction gave 1.81 g. of 6-fluoro-9β,10α-androsta-2,4,6-triene-3,17β-diol 3,17-diacetate with a melting point of 184–185°. The physical constants of the analytically pure substance are:

Melting point: 185.5–187°.
$[\alpha]_D^{25}=-324°$ (CHCl$_3$).
$\epsilon$ (max.=301.5 nm.)=13450 (methanol).
Found: C 70.93, 71.08; H 7.11, 7.25; F 4.49, 4.28.
Calcd. for C$_{23}$H$_{29}$O$_4$F (388.46): C 71.11; H 7.52; F 4.89.
Infrared bands at: 862, 1032, 1045, 1080, 1125, 1155, 1214, 1255, 1648, 1672, 1688, 1725, 1732, 1763, 3020 and 3060 cm.$^{-1}$.

EXAMPLE III

According to Example II, a solution of 1.9 g. of 6-chloro-17β-hydroxy-9β,10α-androsta-4,6 - dien-3 - one 17-acetate in 26 ml. of acetic anhydride, 10 ml. of acetyl chloride and 1.1 ml. of pyridine was heated for 3 hours at ~95° in a nitrogen atmosphere. Work-up was followed by recrystallization from methanol containing some pyridine at 0°; yielding 1.95 g. of 6-chloro-9β,10α-androsta-2,4,6-triene-3,17β-diol 3,17-diacetate with a melting point of 157–158°. The pure substance showed the following physical constants.

Melting point 158–159°.
$[\alpha]_D^{25} = -365°$ (CHCl₃).
$\epsilon$ (max.=303 nm.)=12950 (methanol).
Found: C, 67.94, 68.05; H, 7.15, 7.27; Cl, 8.46, 8.64.
Calcd. for $C_{23}H_{29}O_4Cl$ (404.92): C, 68.22; H, 7.22; Cl, 8.75.
Infrared bands at: 889, 901, 922, 1029, 1045, 1119, 1160, 1185, 1215, 1250, 1615, 1732, 1755, 3050 and 3070 cm.⁻¹.

What is claimed is:
1. A compound of the formula

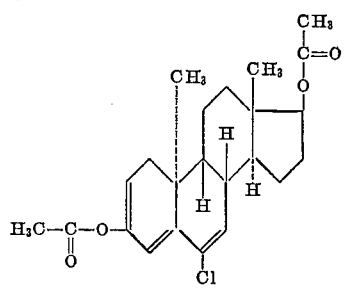

2. A compound of the formula

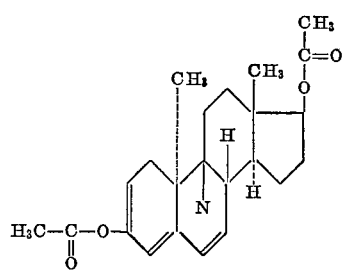

3. A compound of the formula

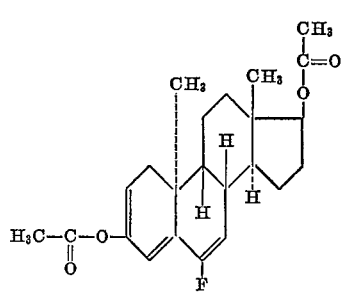

4. A compound of the formula:

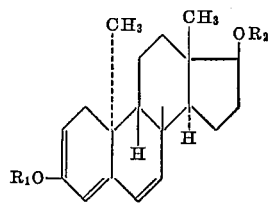

wherein $R_1O$ is a member of the group consisting of alkoxy of 1–20 carbon atoms and aralkoxy wherein the aliphatic moiety contains from 1–6 carbon atoms and the oxygen is attached to the aliphatic moiety and $OR_2$ is selected from the group consisting of hydroxy, a member of the group consisting of alkoxy of 1–20 carbon atoms and aralkoxy wherein the aliphatic moiety contains from 1–6 carbon atoms and the oxygen is attached to the aliphatic moiety and acyloxy of 1–20 carbon atoms.

5. A compound of the formula:

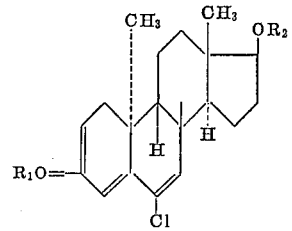

wherein $R_1O$ is a member of the group consisting of alkoxy of 1–20 carbon atoms and aralkoxy wherein the aliphatic moiety contains from 1–6 carbon atoms and the oxygen is attached to the aliphatic moiety, and $OR_2$ is selected from the group consisting of hydroxy, a member of the group consisting of alkoxy of 1–20 carbon atoms and aralkoxy wherein the aliphatic moiety contains from 1–6 carbon atoms and the oxygen is attached to the aliphatic moiety and acyloxy of 1–20 carbon atoms.

6. A compound of the formula:

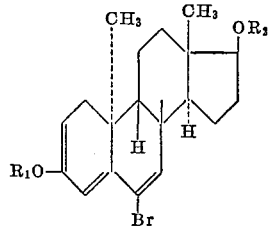

wherein $R_1O$ is a member of the group consisting of alkoxy of 1–20 carbon atoms and aralkoxy wherein the aliphatic moiety contains from 1–6 carbon atoms and the oxygen is attached to the aliphatic moiety, and $OR_2$ is selected from the group consisting of hydroxy, a member of the group consisting of alkoxy of 1–20 carbon atoms and aralkoxy wherein the aliphatic moiety contains from 1–6 carbon atoms and the oxygen is attached to the aliphatic moiety and acyloxy of 1–20 carbon atoms.

7. A compound of the formula:

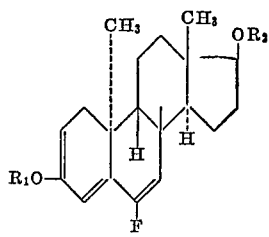

wherein $R_1O$ is a member of the group consisting of alkoxy of 1–20 carbon atoms and aralkoxy wherein the aliphatic moiety contains from 1–6 carbon atoms and the oxygen is attached to the aliphatic moiety and $OR_2$ is selected from the group consisting of hydroxy, a member of the group consisting of alkoxy of 1–20 carbon atoms and aralkoxy wherein the aliphatic moiety contains from 1–6 carbon atoms and the oxygen is attached to the aliphatic moiety and acyloxy of 1–20 carbon atoms.

8. A compound of the formula:

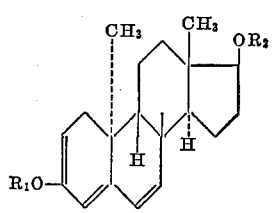

wherein $R_1O$ is acyloxy of 1–20 carbon atoms, and $OR_2$ is selected from the group consisting of hydroxy, a member of the group consisting of alkoxy of 1–20 carbon atoms and aralkoxy wherein the aliphatic moiety contains from 1–6 carbon atoms and the oxygen is attached to the aliphatic moiety and acyloxy of 1–20 carbon atoms.

9. A compound of the formula:

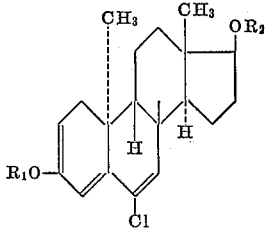

wherein $R_1O$ is acyloxy of 1–20 carbon atoms, and $OR_2$ is selected from the group consisting of hydroxy, a member of the group consisting of alkoxy of 1–20 carbon atoms and aralkoxy wherein the aliphatic moiety contains from 1–6 carbon atoms and the oxygen is attached to the aliphatic moiety and acyloxy of 1–20 carbon atoms.

10. A compound of the formula:

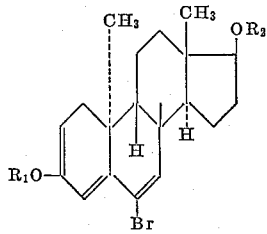

wherein $R_1O$ is acyloxy of 1–20 carbon atoms, and $OR_2$ is selected from the group consisting of hydroxy, a member of the group consisting of alkoxy of 1–20 carbon atoms and aralkoxy wherein the aliphatic moiety contains from 1–6 carbon atoms and the oxygen is attached to the aliphatic moiety and acyloxy of 1–20 carbon atoms.

11. A compound of the formula:

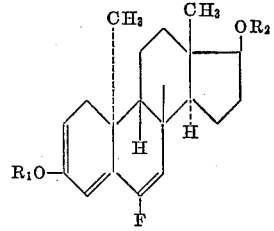

wherein $R_1O$ is acyloxy of 1–20 carbon atoms, and $OR_2$ is selected from the group consisting of hydroxy, a member of the group consisting of alkoxy of 1–20 carbon atoms and aralkoxy wherein the aliphatic moiety contains from 1–6 carbon atoms and the oxygen is attached to the aliphatic moiety and acyloxy of 1–20 carbon atoms.

References Cited

UNITED STATES PATENTS 2,926,163   2/1960   Dauben et al. ____ 260—239.55
2,933,509   4/1960   Chemerda et al. ____ 260—397.2

LEWIS GOTTS, *Primary Examiner.*
ELBERT L. ROBERTS, *Examiner.*

UNITED STATES PATENT OFFICE
CERTIFICATE OF CORRECTION

Patent No. 3,336,346                        August 15, 1967

Pieter Westerhof et al.

It is hereby certified that error appears in the above numbered patent requiring correction and that the said Letters Patent should read as corrected below.

Column 6, line 15, for "2300" read -- 23000 --.

Signed and sealed this 22nd day of October 1968.

(SEAL)
Attest:

Edward M. Fletcher, Jr.                      EDWARD J. BRENNER

Attesting Officer                            Commissioner of Patents